May 12, 1942.  F. S. DENNEEN ET AL  2,282,322

APPARATUS FOR ELECTRIC HEATING

Filed Nov. 10, 1938  2 Sheets-Sheet 1

INVENTORS
Francis S. Denneen and
William C. Dunn
BY Fay, Oberlin & Fay
ATTORNEYS.

May 12, 1942. F. S. DENNEEN ET AL 2,282,322
APPARATUS FOR ELECTRIC HEATING
Filed Nov. 10, 1938 2 Sheets-Sheet 2

INVENTORS
Francis S. Denneen and
William C. Dunn.
BY Fay, Oberlin & Fay
ATTORNEYS.

Patented May 12, 1942

2,282,322

UNITED STATES PATENT OFFICE 2,282,322

APPARATUS FOR ELECTRIC HEATING

Francis S. Denneen, Cleveland, and William C. Dunn, Shaker Heights, Ohio, assignors to The Ohio Crankshaft Company, Cleveland, Ohio, a corporation of Ohio Application November 10, 1938, Serial No. 239,812

3 Claims. (Cl. 219—13)

This invention relates to apparatus for hardening the outer peripheral rim of circular ferrous articles and is more particularly directed to car wheels of various sizes and shapes.

It is old to harden car wheel rims by heating and quenching but wheels made in this manner heretofore have been subject to various undesirable characteristics, including irregularity in hardening and checks or cracks adjacent the wearing face. Furthermore, the time required has been excessive.

The chief object of our invention has been to provide an improved apparatus for hardening the rim of car wheels and the like in a minimum period of time and in such manner as results in an improved product. The apparatus, while specifically described in connection with single flange car wheels, is applicable to any article, such as metal tires and the like, having a peripheral hardened face. The article may be double flanged if desired.

Other objects of our invention will become apparent from the specification when read in the light of the accompanying drawings and the novel features thereof are summarized in the claims.

Our invention includes apparatus to inductively heat the rim of a car wheel above the critical temperature thereof and quenching means to cool the heated rim. To inductively heat the rim, flux paths are induced therein by suitable inductor elements supplied with electrical energy from a generator or other source. Alternating current of varying frequency is employed, depending on the depth to which the rim is to be hardened.

Figure 1:
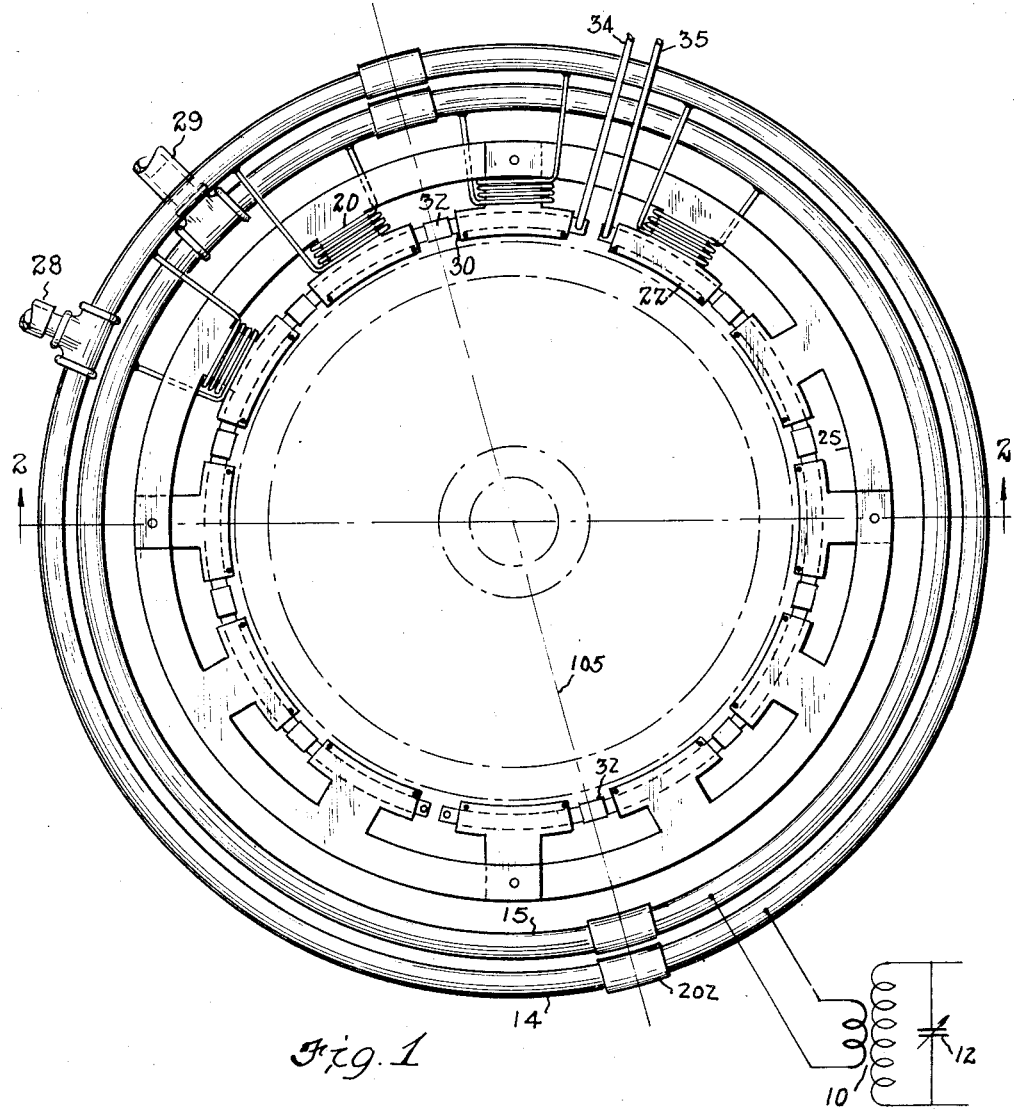
Fig. 1 is a plan view, partly schematic, of the preferred form of apparatus used.

Referring to Fig. 1, current is impressed on the primary of the transformer 10 and the supply circuit maintained in resonance by an adjustable condenser 12. Leads from the secondary of the transformer are connected to a pair of hollow tubular copper rings 14 and 15 supported in a frame 17 carrying the heating apparatus and insulated therefrom. The rings are so arranged that current flows through one in a direction opposite to the flow in the other to reduce the inductive effect on the adjacent parts of the apparatus.

Figures 2, 2A:
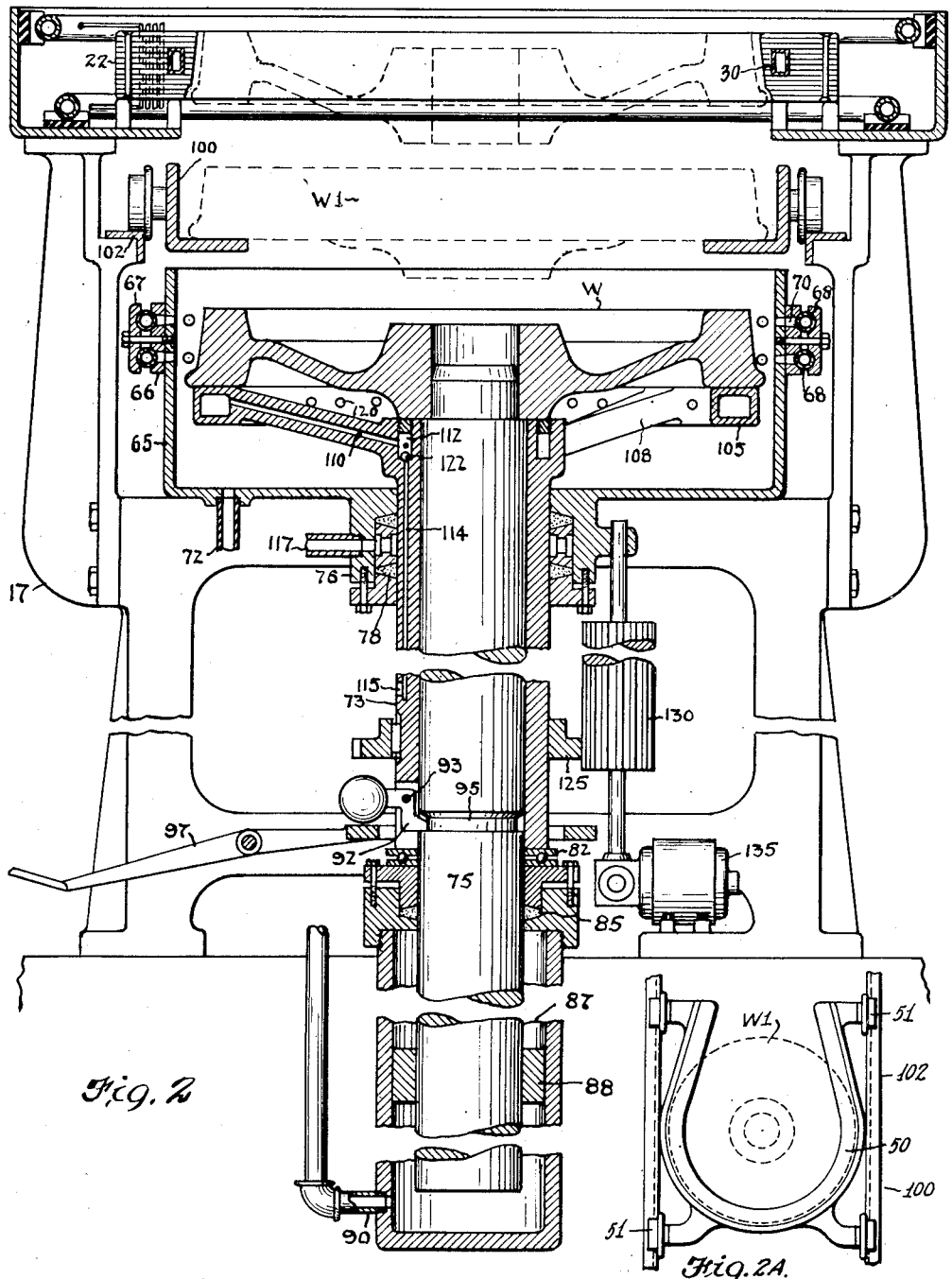
Fig. 2 is a transverse section through Fig. 1 as indicated by the lines 2—2 thereon.
Fig. 2a is a plan view of a wheel conveyor.

A series of inductor coils 20 are connected to the rings 14 and 15 and coact to establish the flux field in the wheel to be heated. These coils are formed of hollow copper tubing, are supported on respective cores 22 and are preferably spaced therefrom. The cores 22 are laminated as best shown in Fig. 2 and are each maintained integral with a main core ring 25, which is also laminated. The lamination forming cores 22 may be integral with a series of overlapping laminations forming the core ring, in which case it is necessary to wind the coil 20 after the apparatus has been assembled. An alternative construction is to maintain the core ring and each of the cores 22 separate and assemble the same after the coils 20 have been slipped in place.

As shown in Fig. 1, the cores 22 closely surround the rim of the wheel being heated to provide a minimum air gap between the cores and wheel. The cores 22 are T shaped with the bases thereof connected to the main core ring 25 and with the unsupported tops thereof arcuate. A coil is provided for each of the bases and is connected to the main conducting rings 14 and 15 by reversing the order of connecting the leads of adjacent coils. Thus adjacent poles of adjacent unsupported tops are opposite poles so that the poles alternate around the ring formed by such unsupported tops. Due to this manner of connection the coils establish a flux path extending around the wheel rim and heat the same to hardening temperatures.

Due to the heating effect of the apparatus and the reflected heat from the wheel, it is necessary to cool both the cores and the coils surrounding them. To this end the connecting rings 14 and 15 are hollow as is the copper tubing forming the inductor coils 20. Cooling liquid is pumped into one of the copper rings at 28 and is removed from the other ring at 29. The connections 28 and 29 must necessarily include an electrical insulating element to prevent electrical leakage between the apparatus and the source of coolant. The liquid passes from one ring to the other through the hollow copper coils 20, thus cooling the coils.

The cores 22 are cooled by a circumferential water passage extending through the work adjacent face or unsupported top of each core. This is best shown in Fig. 2 as comprising rectangular segments of tubing 30 passing through each core and connected together by electrical insulating and heat resisting connectors 32. An intake to the ring is provided at 34 and an outlet at 35, each electrically insulated from the course of coolant. I prefer to employ a liquid coolant because of the high capacity for absorbing heat, but if desired, air under pressure may be circulated through this system.

The apparatus just described may be generally termed the "heating ring" or "inductor" by which heating is accomplished in the car wheel to be hardened. The wheel is supported in a manner hereafter described and positioned within the heating range of the cores and coils 22 and 20 respectively and there maintained for the required heating period. The support further positions the wheel for quenching and also for loading and unloading.

After a wheel has been heated to hardening temperature by the heating ring, the same is quenched by projecting quenching fluid at high pressure onto the surface heated and at the same time submerging the wheel in a quench bath. The wheel supporting mechanism hereafter described is lowered to place the wheel in the position shown in Fig. 2, in which position the rim portion is adjacent the quench nozzles.

The quenching apparatus includes an inlet 72 for a tank 65 to which is secured by suitable bolts a pair of rings 66 and 67. Compressed between the rings is a pair of hollow copper tubes 68 discharging to orifices 70 spaced peripherally around the tank and in position to project quenching liquid against the heated rim portion of the wheel. Quenching liquid is supplied to the tubes by a suitable feed line and pump not shown and sufficient liquid to cover the wheel being quenched is normally maintained in the tank 65.

We combine the cooling due to immersion of the wheel with the cooling by the spray nozzles to quench the wheel. The nozzles function to throw streams of liquid against the heated portion of the wheel with sufficient force to remove the gas bubbles adjacent the heated surface, the presence of which produces irregular hardening over the surface. At the same time, the main body of heat in the wheel is withdrawn by the liquid in the tank.

The wheel is movably supported in position to be heated or quenched as desired, and to be intermediately positioned for loading and unloading. To this end the mechanism shown in Fig. 2 is employed. This mechanism comprises a reciprocal sleeve 73 and shaft 75, each movable with respect to the other and to the supporting frame 17. The sleeve and shaft are supported at their upper ends by a downwardly projecting portion 76 of the quench tank 65. Leakage between the sleeve and tank is eliminated by the packing gland 78. At its lower end the sleeve 73 is supported on a thrust bearing 82 while the shaft passes through a packing ring 85 into a fluid piston 87.

The shaft 75 is reciprocated to occupy one of three positions, namely, loading, heating, and quenching, followed by a return to the loading station for unloading. This reciprocation is accomplished by varying the fluid pressure in the cylinder 87 beneath the packing ring 88 integrally carried on the shaft. The pressure is varied in the cylinder by fluid pumped through the supply pipe 90. The shaft may be raised or lowered as desired and maintained in that position by holding the fluid pressure in the cylinder constant.

The sleeve 73 shifts vertically with the shaft 75 to aid in the heat treating operation and locks therewith by a catch member 92 pivotally carried by the sleeve at 93 and engaging an angular recess 95 in the shaft. The catch may be displaced by moving a forked foot lever 97 which has a catch engaging ring encircling the sleeve and engaged by the lever fork.

The wheel and supporting shaft 75 together with the sleve 73 are moved to the desired positions in the following manner: The foot pedal 97 is shifted, withdrawing the catch 92 from the annular recess 95. This is followed by increasing the fluid pressure in the cylinder 87 to position the wheel supporting face of the shaft in the loading position and to pick up the wheel W—1 in that position, off a conveyor means 100. As shown in Fig. 2a said means consists in a car frame 50, which in the particular embodiment shown is shaped like a horseshoe; it is, however, not necessary that member 50 is shaped in this way, it could be made elliptical, provided one end be left open. In cross-section the frame is L-shaped, as shown in Fig. 2, the bottom part of the L serving to receive the wheel W1. The car is provided with four rollers 51 running on a track 102, which is supported by frame 17. As the shaft 75 rises it picks up the wheel and lifts it off and above car 100, the latter being withdrawn as the wheel clears the frame 50. Pressure in the piston 87 is then decreased allowing the wheel and shaft to drop to the position shown in heavy lines in Figure 2. At this point the catch 92 engages the ring 95 and when pressure in the cylinder is increased to raise the shaft 75 to the heating position, the sleeve 73 moves therewith.

At the termination of the heating operation the sleeve and shaft are lowered to the quenching position in Figure 2, and following this the catch 92 is released and the shaft 75, released from the sleeve, raises the wheel to the position shown at W—1 for unloading. After the hardened wheel is removed, the same sequence is repeated.

Means for rotating the wheel during heating and quenching is carried by the sleeve 73 and comprises a cooling ring 105 having arms 108. When it is desired to maintain a certain portion, such as the flange of a wheel in a relatively unhardened condition, such portion is engaged by and kept cool by this cooling ring.

Cooling liquid is circulated through the ring 105 to withdraw a predetermined amount of heat from the adjacent portion of the wheel rim and limit the zone of the hardened contour in the wheel. To this end a fluid line 110 leads from the ring 105 through one or more of the arms 108 to an annular passage 112 in the sleeve 73 which communicates with a passage 114 passing down the sleeve to terminate at opening 115. This opening is positioned to register with an intake supply 117 when the sleeve and wheel are raised to the heating position. In the heating position coolant circulates from the pipe 117 through the ring 105 and accomplishes the desired cooling action due to intimate contact between the ring and wheel.

The circulating coolant is discharged from the ring through orifices 120 positioned to project streams against the underside of the web portion of the wheel and thus maintain the latter in a substantially unhardened condition. As soon as the sleeve and wheel are lowered from the heating position, the opening 115 and the pipe 117 no longer register and further supply of coolant is cut off. At the same time a check valve 122 prevents emptying the quench ring in reverse direction through the orifices 120 and the uncovered opening 115.

We prefer to employ mechanism to rotate the wheel during both the heating and quenching operations. For this purpose there is provided a gear 125 keyed to the sleeve 73 and rotatably driven by a wide faced pinion 130 rotatably carried on the support 17. The pinion in turn is driven by an electric motor 135 through suitable reduction gearing to obtain the desired rate of rotation for the wheel. It will be apparent that, due to the length of the pinion face, the wheel may rotated in both the heating and quenching positions.

In practice, the wheel W is supported in heating position by the sleeve and shaft. Heating current of determined frequency is passed through the inductors 20 inducing a heating flux field in the wheel rim. The field is maintained until the desired temperature is reached in all portions to be hardened. Immediately thereafter the wheel is lowered into the quenching tank and quenched, preferably being rotated during the quenching operation.

The bulk of the wheel treated in most cases is such that it is desirable to normalize the structure after the heating and quenching operation. This is accomplished by again raising the wheel into the heating ring and reheating. It may also be done by conventional means in order to leave the apparatus free for the actual hardening operations. After the wheel has been heated and quenched it is removed from the supporting hub and a new wheel mounted thereon.

Various controls may be provided for the described apparatus and, if desired, the entire unit may be made automatic. The value of the heating current may be varied, and further control of the heating period obtained by controlling the rate of passage of coolant through the coils and cores. The rate of quench may be similarly controlled both as to the amount of quenching fluid supplied and the duration of the interval between the heating and quenching operations.

In the typical operation as just described, the wheel is quenched immediately after heating. In many cases, however, it is desirable to provide a delayed quench, that is, an appreciable interval between the wheel heating and quenching operations to permit penetration of the heat induced to the rim portion deeper into the wheel. Similarly, various cross-sections may be produced in wheels hardened with this apparatus.

As the cooling coil 105 is removed from proximity with the flange of the wheel, the same will be heated and hence hardened. When the ring is in cooling position against the flange, however, only the wear receiving portions of the rim and flange become heated to a critical temperature and hence hardened. The contour of the cores 22 along their work adjacent faces also controls the contour of the hardened cross-section in the wheel. Thus the cores 22 may have a work adjacent surface, as shown in Fig. 2, which is closer to the wheel at the flange than at the outer rim edge. This difference compensates for the tendency of the flux path to follow that portion of the surface which is of the least diameter and more heat is supplied to the wheel where the core is closest than to that portion of less diameter where the core spacing is greater.

Figure 3:
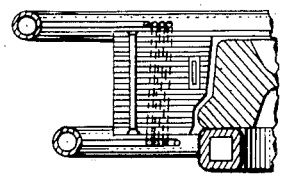
Fig. 3 is a fragmentary section corresponding to Fig. 2 showing one form of core construction.

Fig. 3 shows a core system 22 coinciding as closely as practical with the contour of that portion of the wheel to be hardened. This results in a wheel with a flange hardened on the rail adjacent portion as well as a hardened rim adapted to bear directly on the rail.

From the foregoing description it will be apparent that we have provided an improved apparatus for hardening the peripheral rim of car wheels, metal tires, and the like, and that our improved apparatus is adapted to various conditions of operation and to the production of various configurations in cross-sections of hardened zones.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. In apparatus for inductively heating the rail engaging portion of a car wheel or the like, an inductor comprising a ring-like element having a plurality of magnetically permeable T-shaped projections extending interiorly thereof, each projection having a base and an unsupported top, the bases connecting the unsupported tops to the element, the unsupported tops being arcuate to substantially form a ring within the first named ring for accommodating the rail engaging portion of said car wheel, each of the unsupported tops of the T-shaped projections having an opening therethrough longitudinally thereof, electrically insulating means interposed between adjacent ends of adjacent openings for electrically insulating said unsupported tops from each other, means for supplying coolant to one of said openings and to circulate the same through other of said openings and then withdrawing the same, a plurality of coils, each coil surrounding a base of a T-shaped projection, and means for supplying periodically varying current to said coils, said means being connected to cause current in adjacent coils to flow in opposite directions so that adjacent unsupported tops are of opposite polarity.

2. In apparatus for inductively heating a car wheel or the like, a horizontally disposed ring-like inductor member shaped to correspond with and lie in heating relation to the rail-engaging portion of a car wheel, conveyor means for positioning a wheel in axial alignment with said inductor member, means reciprocable along the axis of said inductor member for engaging the hub portion of said wheel and moving the same into heating relation with said inductor member, a cooling ring adapted to engage an annular surface of said wheel, means to reciprocate said ring along the axis of said inductor member and means operative at a predetermined point in movement of said first-named reciprocable means to engage said cooling ring to move said first-named reciprocable means and said ring as a unit.

3. In apparatus for inductively heating a car wheel or the like, a horizontally disposed ring-like inductor member shaped to correspond with and lie in heating relation to the rail engaging portion of a car wheel, means for positioning a wheel in axial alignment with said inductor member, means reciprocable along the axis of said inductor member for engaging the hub portion of said wheel and moving the same into heating relation with said inductor member, a cooling ring adapted to engage an annular surface of said wheel, means to reciprocate said ring along the axis of said inductor member, a latch mechanism comprising one part carried by one of said reciprocable means and the other part carried by the other of said reciprocable means and means adapted to engage said latch mechanism at a predetermined point in relative movement between said first-named reciprocable means and said cooling ring to move said first-named reciprocable means and said ring as a unit.

WILLIAM C. DUNN.
FRANCIS S. DENNEEN.